United States Patent [19]

Tatekura et al.

[11] Patent Number: 4,595,284

[45] Date of Patent: Jun. 17, 1986

[54] METHOD AND APPARATUS FOR MEASURING DISTRIBUTION OF ELONGATION IN AN OPTICAL CABLE

[75] Inventors: Koichi Tatekura, Hiratsuka; Kiyofumi Mochizuki, Hachioji; Yoshihiro Ejiri, Tokyo, all of Japan

[73] Assignee: Kokusai Denshin Denwa Co., Ltd., Japan

[21] Appl. No.: 564,534

[22] Filed: Dec. 22, 1983

[30] Foreign Application Priority Data

Jan. 7, 1983 [JP] Japan ................................. 58-514

[51] Int. Cl.$^4$ ............................................. G01N 21/84
[52] U.S. Cl. ................................................. 356/73.1
[58] Field of Search ....................................... 356/73.1

[56] References Cited

PUBLICATIONS

Lin et al., "Backward Stimulated Raman Scattering in Multimode Fiber" Applied Optics, vol. 17 #, 16 (Aug. 15, 1978) pp. 2486-2488.

Primary Examiner—Vincent P. McGraw
Attorney, Agent, or Firm—Armstrong, Nikaido, Marmelstein & Kubovcik

[57] ABSTRACT

Elongation distortion at any location of an optical fiber cable is measured by using the principle of the stimulated Raman effect in which a stokes beam with a little frequency difference from that of a pumping beam is generated when a pumping beam and a seed beam with the same frequency as that of the stokes beam meet in a Raman material like an optical fiber cable. Due to the fact that the group refractive index of an optical fiber cable for a pumping beam is different from that for a stokes beam, elongation of a cable is measured by observing time difference of the arrival of pumping beam and stokes beam. The location that the pumping beam meets with the stokes beam can be adjusted merely by shifting the pumping pulse, then, elongation distortion at any location can be measured. According to the invention, the pumping pulse is applied to the cable to be tested from both the ends of the cable with one of the pumping pulse delayed according to the desired location for meeting of two pulses. At one end of the cable, the arrival time $t_1$ and $t_2$ is observed, where $t_1$ is the arrival time of the stokes pulse and $t_1 + t_2$ is the arrival time of the pumping pulse. The distribution of elongation ($d\Delta z/dz$) is obtained by calculating the equations $z = k_1 t_1 - k_2 t_2$, and $\Delta z = k_3 t_2 - k_4 t_1$, where $k_1$, $k_2$, $k_3$ and $k_4$ are constants, z is the length between the end and the location to be tested, and $\Delta z$ is the elongation of the cable of the length z.

4 Claims, 7 Drawing Figures

METHOD AND APPARATUS FOR MEASURING DISTRIBUTION OF ELONGATION IN AN OPTICAL CABLE

BACKGROUND OF THE INVENTION

The present invention relates to process for measuring elongation distribution of an optical fiber cable.

An optical fiber cable has the nature that the bandwidth of the same is quite wide and the transmission loss is small, therefore, that cable is promising for transmission medium for a long distance digital transmission cable. However, the optical fiber cable has the disadvantage that it is mechanically weak, in particular, a submarine optical fiber cable elongates 0.3–0.4% when installed, and also elongates 0.6–0.7% when it is picked up on a deck of a boat for repairing. The characteristics of an optical fiber cable depends upon the elongation of the same, therefore, the measurement of the elongation of an optical fiber cable is essential to keep the high reliability of an optical fiber cable.

A prior method for measuring elongation of an optical fiber cable is first described in accordance with FIG. 1, in which an optical pulse 2 is applied to an input end 11 of an optical fiber cable to be measured, and an output pulse is derived at the other end 12 of the cable, then, the delay time ($\tau$) by the transmission of the optical pulse provides the elongation $\Delta L$ of the cable. That value, elongation $\Delta L$, is calculated by the known equation (1) as follows.

$$(\tau) = (N/c)L + (N'/c)\Delta L \quad (1)$$

In the equation (1), N is the group refraction index of a cable to be measured, N' is the equivalent group refractive index which is defined by the optical elastic effect by the cable 1, c is the light velocity in free space, L is the original length of the cable. Other prior system for measuring elongation of an optical fiber cable is phase method, or interference method, which uses the same theoritical principle as that of FIG. 1.

However, a prior method for measuring elongation of an optical fiber cable has the disadvantage that it can measure only the total elongation of the cable, but it can not provide an information where and how a cable is elongated. It should be noted that the characteristics of the optical fiber cable are not determined by an average elongation of the cable, but they depends upon the history of the elongation at various points of the cable.

Therefore, it is essential to measure the distribution of the elongation of an optical fiber cable for the study and the design of an optical fiber cable system.

SUMMARY OF THE INVENTION

It is an object of the present invention to overcome the disadvantages and limitations of a prior measuring system for an optical fiber cable by providing a new and improved process for measuring an elongation of an optical fiber cable.

It is also an object of the present invention to provide a process for measuring elongation of an optical fiber cable so that an elongation at each designated portion of a cable can be measured.

The above and other objects are attained by using the principle of the stimulated Raman effect in which a stokes beam with a little frequency difference from that of a pumping beam is generated when a pumping beam and a seed beam with the same frequency as that of the stokes beam meet in a Raman material like an optical fiber cable. Since the group refractive index of an optical fiber cable for a pumping frequency is different from that for a stokes frequency, the time difference between the arrival of the pumping pulse to the end of the cable and the arrival of the stokes pulse to that end is observed, and that time difference implicites the elongation distribution. The present invention comprises the steps of applying optical pulses to the ends of an optical fiber cable to be tested from both the ends of the cable so that those optical pulses meet at desired location along the cable, measuring time $t_1$ and time $t_2$, where $t_1$ is the arrival time of the faster pulse of the stokes pulse and the pumping pulse, and $t_1+t_2$ is the arrival time of the other pulse, and providing distribution of elongation ($d\Delta z/dz$) using the equations $z = k_1 t_1 - k_2 t_2$ and $\Delta z = k_3 t_2 - k_4 t_1$, where $k_1$, $k_2$, $k_3$ and $k_4$ are constants, z is the length of the cable between the end and the location to be tested, and $\Delta z$ is the elongation of the cable of the length z.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The stimulated Raman effect which is used in the present invention, is described first for the easy understanding of the present invention. It has been known that when an optical beam (pumping beam) with a predetermined frequency ($\nu_0$) illuminates a material which reflects irregularly or scatters the beam, it is observed not only the original pumping beam, but also the first stokes beam with the frequency ($\nu_0-\nu_1$), the second stokes beam with the frequency ($\nu_0-2\nu_i$) and the third stokes beam with the frequency ($\nu_0-3\nu_i$) et al. by observing the beam through a spectrum analyzer. That phenomenon is called the Raman effect.

The strength of the Raman effect depends upon the product of the power density of an optical energy and the Raman gain which is defined by the transmission material itself (Raman material), and the transmission length which the optical beam transmits in the Raman material. The silica ($S_iO_2$) which is the material of an optical fiber is one of the Raman material, and the first stokes beam with the wavelength 1.12 micron is observed when a YAG laser with the wavelength 1.06 micron excites an optical fiber. The difference between the wavelengths of 1.12 micron and 1.06 micron is defined by the Raman material. Although the Raman effect is not observed when the power density is small, it should be appreciated that the power density in an optical fiber is extremely large even when the power of an optical source is small (for instance, less than several watts), since the diameter of an optical fiber is very small (for instance that diameter is less than 10 microns). Further, when an optical beam transmits in an optical fiber which is longer than several kilo-meters, the Raman effect is easily observed. The observation of the Raman effect with the optical source less than several watts has been reported.

The Raman effect is considerably strong when the original pumping beam (of the wavelength 1.06 micron in the present embodiment), and the first stokes beam with the wavelength $v_0-v_i$ (=1.12 micron) are applied simultaneously to a Raman material. That effect, that the pumping beam is converted to the first stokes beam with high efficiency when a seed beam of the wavelength of the first stokes beam exists, is called the stimulated Raman effect. The present invention uses that stimulated Raman effect in an optical fiber cable.

Figure 1:
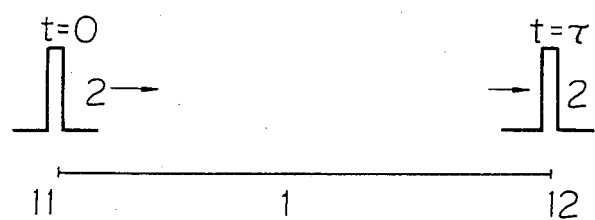
FIG. 1 shows the explanatory drawing for the explanation of a prior measuring method of elongation of an optical fiber cable.
Figure 2:
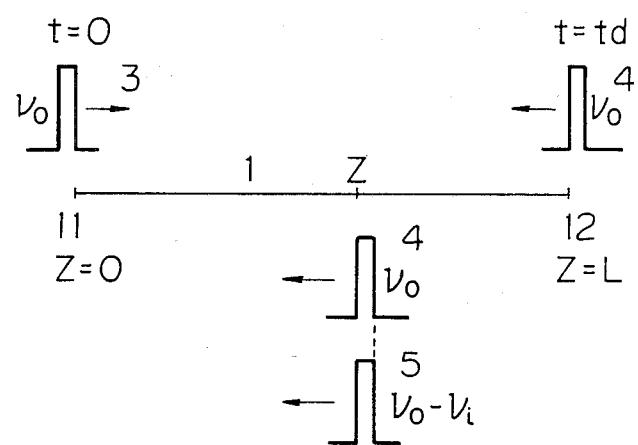
FIG. 2, FIG. 3, FIG. 4 and FIG. 5 show the principle of the present invention, and show how to generate a stokes pulse at any location of a cable.

FIG. 2 shows the basic concept of the present invention, and the generation of the stokes pulse 5 of the frequency $v_0-v_i$ at any location of the optical fiber cable 1. It is supposed that the pulse 3 with the frequency $v_0$ and the pulse 4 with the frequency $v_0$ are applied to the optical fiber cable 1 from the opposite ends at the time $t=0$ and $t=t_d$, respectively. Those pulses 3 and 4 meet with each other at the location z along the optical fiber cable 1, then, the stokes pulse 5 is generated at the location z. The stokes pulse 5 runs towards the end 11 of the cable 1 with the beam 4. The location z where the pulses 3 and 4 meet with each other depends upon the start time $t_d$ of the pulse 4. When the start time $t_d$ is changed between $-N_pL/c$ and $N_pL/c$, the location z changes between 0 and L, where $N_p$ is the group refractive index of the optical pulses 3 and 4.

Figure 3:
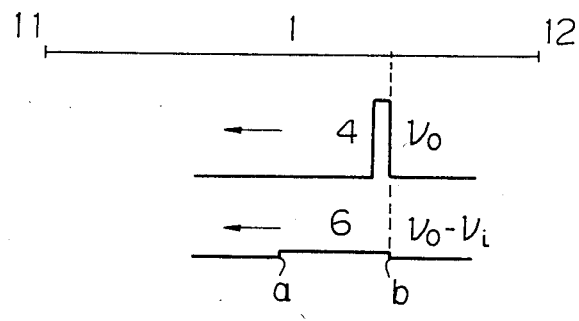
Figure 4:
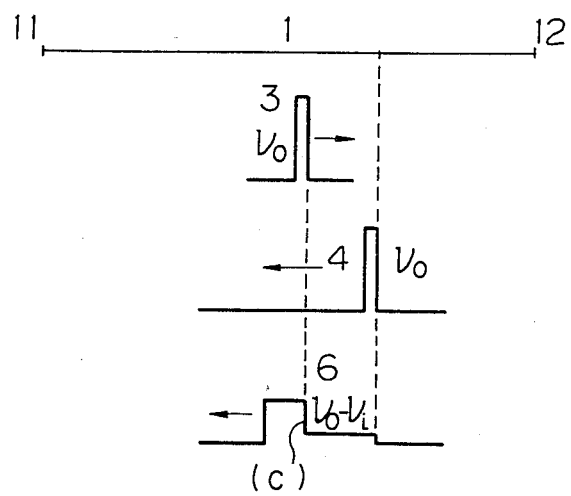

Next, the reason of the generation of the stokes pulse 5 in FIG. 2 is described in accordance with FIGS. 3 and 4. When the optical pulse 4 transmits in the optical fiber cable 1, a stokes pulse is generated according to the Raman effect, and the generated stokes pulse is transmitted with the original optical pulse 4. FIG. 3 shows the transmission of the pulse 4 and the stokes beam 6 when the group refractive index $N_s$ of the stokes beam is smaller than the group refractive index $N_p$ of the original beam 4. The head end (a) of the stokes beam 6 is generated when the original beam 4 passes the input end 12, and the rear end (b) of the stokes beam 6 is generated when the original beam 4 passes the present location in the cable 1. It should be noted that the level of the stokes beam 6 is considerably small when the power density of the original beam 4 is not large.

Figure 5:
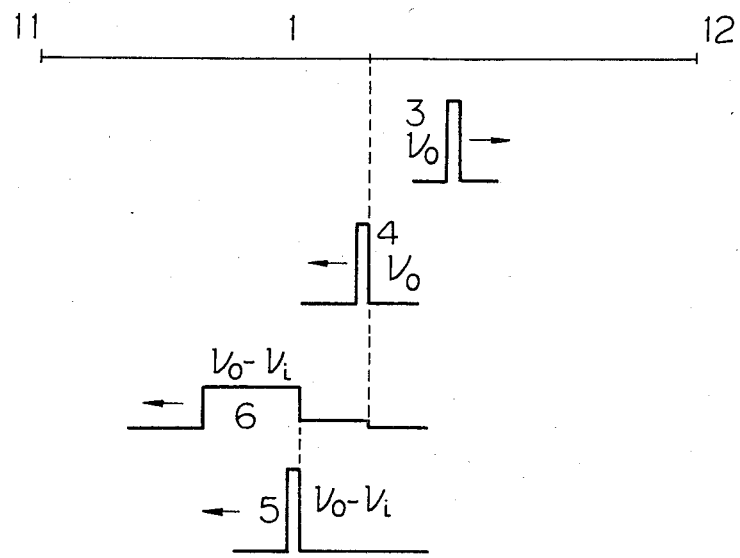

The stimulated Raman effect amplifies the stokes beam 6 when the stokes beam 6 which is generated by the beam 4 meets with another beam 3 from the opposite direction. The amplification of the stokes pulse is effected only when the stokes pulse 6 meets with the pulse 3, and finishes when the pulse 3 meets with the rear end (b) of the beam 4, as no stokes pulse towards the end 11 exists after the beam 4. The amplification of the stokes pulse 4 is shown in FIGS. 4 and 5.

The rear falling edge (c) of the stokes beam 6 (see FIG. 4 is generated just when the first pulse 4 meets with another pulse 3. Since that rear falling edge (c) is steep, that rear edge is called a pulse (pulse 5), and the pulse 5 is defined by the rear edge of the stokes pulse 4. On the other hand, when the group refractive index $N_s$ of the stokes beam 6 is larger than the group refraction index $N_p$ of the original beam, the stokes pulse 5 is defined by the front edge of the stokes beam 6. Accordingly, the stokes pulse 5 is obtained when the first beam 4 meets with the second beam 3 from the opposite direction irrespective of the group refractive index $N_s$ of the stokes beam 6.

Figure 6:
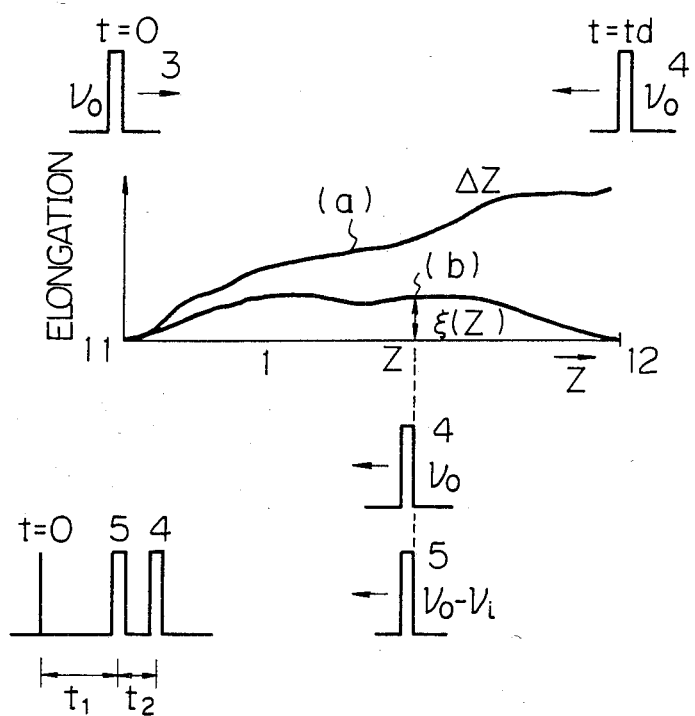
FIG. 6 shows the explanatory drawing for the explanation of the present measurement system.

The principle of the measurement of the distribution of an elongation of an optical fiber cable according to the present invention based upon the generation of a stokes pulse as described is now described in accordance with FIG. 6. In FIG. 6, the curve (a) shows the total (accumulated) elongation $\Delta z$ of the cable 1 between the end 11 and the location z, and the curve (b) shows the elongation distortion $\epsilon(z)$ at the location z of the cable 1. That elongation distortion shows the distribution of the elongation at any location of a cable.

It is supposed that a pair of optical beams 3 and 4 are applied to the opposite ends 11 and 12 of the cable 1 at time $t=0$. Then, those beams 3 and 4 meet with each other at the location z along the cable 1, and the stokes pulse 5 is generated. The generated stokes pulse 5 and the original pumping pulse 4 propagate through cable 1, and reach the end 11 of the cable 1. It is assumed that the stokes pulse 5 reaches the end 11 at time $t=t_1$, and the time difference between the arrival of the stokes pulse 5 and the original pulse 4 to the end 11 is $t=t_2$ (that is to say, the original pumping pulse 4 reaches the end 11 at time $t=t_1+t_2$). It should be appreciated that the stokes pulse 5 and the original pumping pulse 4 do not reach the end 11 of the cable 1 simultaneously, although those pulses 4 and 5 coincide with each other at the location z, because of the difference of the group refractive index of the wavelength of those pulses 4 and 5.

The relations between $t_1$, $t_2$, z and $\epsilon(z)$ are shown by the following equations (2).

$$t_1 = (N_p + N_s)z/c + (N_p' + N_s')(\Delta z)/c \qquad (2)$$
$$t_2 = (N_p - N_s)z/c + (N_p' - N_s')(\Delta z)/c$$

$$\Delta z \approx \int_0^z \epsilon(z)dz$$

where $N_p$ and $N_s$ are group refractive indices of the pumping beam 4 and the stokes beam 5 in a material itself of a transmission medium, respectively, $N_p'$ and $N_s'$ are equivalent group refractive indices of the pumping beam 4 and the stokes pulse 5, respectively, in an optical fiber cable 1, and $\Delta z$ is the elongation of the short length at the location z. It should be noted that the values $N_p'$ and $N_s'$ for an optical fiber cable are different from the values $N_p$ and $N_s$ for the material itself of an optical fiber, and that difference depends upon the photo elastic effect of the optical pulses 4 (or 3) and the stokes pulse 5, the temperature of the cables, and/or the pressure applied to the cable.

The above equation (2) is modified, and the following equation (3) is derived from the above equation (2).

$$z = c(N_p' - N_s')t_1/(2(N_sN_p' - N_pN_s')) - \qquad (3)$$
$$\quad c(N_p' + N_s')t_2/(2(N_sN_p' - N_pN_s')) = k_1t_1 - k_2t_2$$
$$\Delta z = c(N_p + N_s)t_2/(2(N_sN_p' - N_pN_s')) - \qquad (3)$$
$$\quad c(N_p - N_s)t_1/(2(N_sN_p' - N_pN_s')) = k_3t_2 - k_4t_1$$
$$(z) = d\Delta z/dz$$

where $k_1$, $k_2$, $k_3$ and $k_4$ are constants.

Accordingly, the elongation distortion $\epsilon(z)$ at any location along an optical fiber cable is measured by observing the values $t_1$ and $t_2$ while designating the location z by sweeping the start time $t_d$ of the pumping pulse 4.

Further, it should be appreciated that the measurement of the elongation distortion with the use of the only a single end 11 or 12 of the cable may be possible by using a reflection mirror at the other end 12 or 11.

Figure 7:
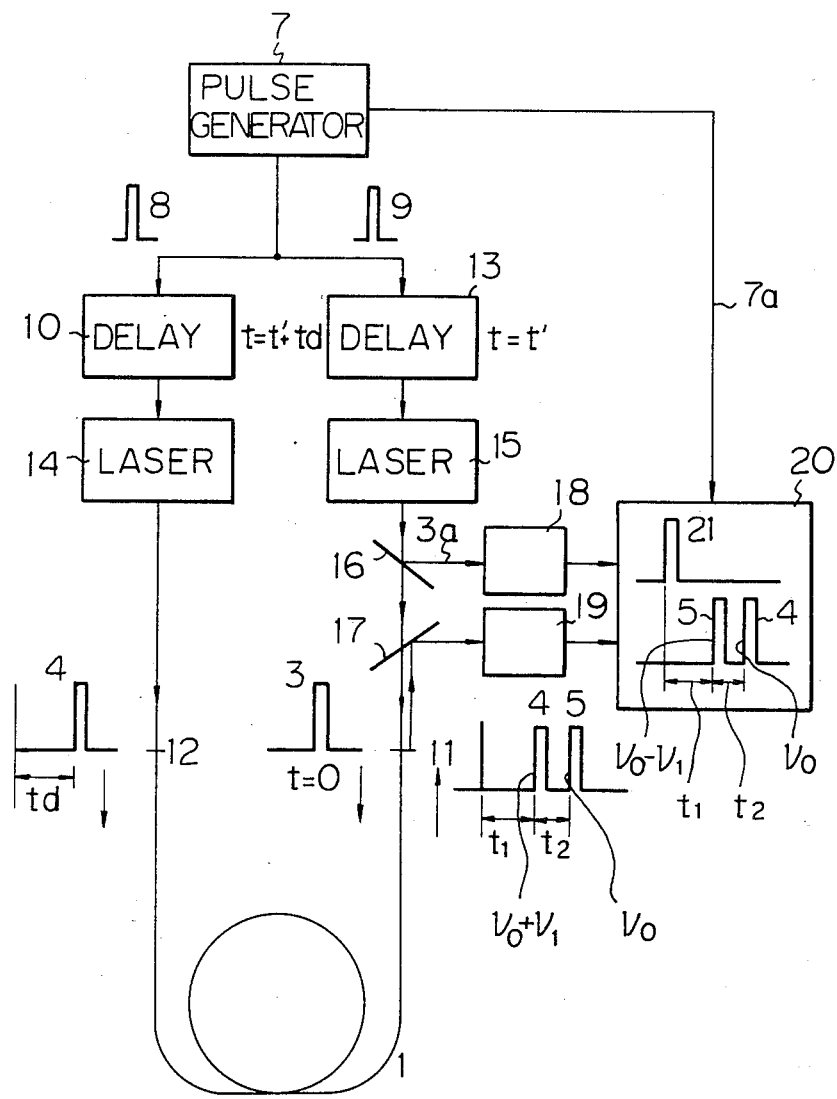
FIG. 7 is a block diagram of the present elongation measurement system.

FIG. 7 shows a block diagram of the apparatus for measuring an elongation distribution of an optical fiber cable according to the present invention.

In FIG. 7, the pulse oscillator 7 provides an electrical output pulse which is divided to the pulses 8 and 9, each applied to the delay circuits 10 and 11, respectively. The first delay circuit 10 delays the pulse 8 by the time $t=t'+t_d$, and the second delay circuit 13 delays the pulse 9 by the time $t=t'$. When $t'=0$, the second delay circuit 13 can of course be removed. The delay time $t_d$ in the first delay circuit 10 is swept or shifted so that the location z covers the whole length of a cable to be tested. The delayed outputs of the delay circuits 10 and 13 excite lasers 14 and 15, respectively, so that a pair of optical pulses with the time interval $t_d$ are provided. Thus, the optical pulse 4 by the laser 14 is delayed by the time $t_d$ as compared with the optical pulse 3 of the laser 15. Those lasers 14 and 15 are for instance implemented by a YAG laser. The optical pulse 3 by the laser 15 is separated to two beams by the beam splitter 16, and the offset beam 3a is applied to an oscillo-scope 20 through the optical-electrical converter 18. The signal 21 converted from the offset beam 3a is used as a time basis in the oscillo-scope 20.

On the other hand, the optical pulse 3 of the laser 15 is applied to the optical fiber cable 1 at the input 11 of the cable 1 through the other beam splitter 17, and the delayed optical pulse 4 is applied to the other end 12 of the cable 1. Then, a stokes pulse is generated at the location where the optical pulses 3 and 4 meet, and both the optical pulse 4 and the generated stokes pulse 5 are provided at the end 11 of the cable 1, as described in detail in accordance with the previous figures. The output optical pulses 4 and 5 are offset by the beam splitter 17, and are applied to the oscillo-scope 20 through the optical-electrical converter 19.

On the screen of the oscillo-scope 20, the reference pulse 21, the stokes pulse 5 and the pumping pulse 4 are indicated, and the time $t_1$ is the duration between the reference pulse 21 and the stokes pulse 5, and the time $t_2$ is the duration between the stokes pulse 5 and the pumping pulse 4. It is supposed in FIG. 7 that the oscillo-scope 20 accepts the synchronization signal from the output of the pulse oscillator 7 through the line 7a.

With those observed values $t_1$ and $t_2$, the location z and the total elongation $\Delta z$ between the location z and the end of the cable are obtained by the equation (3), and thus the curve (a) of FIG. 6 is obtained. Then, the curve (b) which shows the elongation distortion is obtained by differentiating the curve (a). The curve (b) is the final result of the present invention. The calculation of the equation (3) and the differentiation calculation are performed by using a programmed computer which is coupled with the outputs of the optical-electrical converters 18 and 19.

As described above in detail, according to the present invention, the distribution of elongation of an optical fiber cable can be measured by using the principle of the stimulated Raman effect.

From the forgoing, it will now be apparent that a new and improved process for measuring distribution of elongation of an optical fiber cable has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A method for measuring distribution of elongation in an optical fiber cable, comprising the steps of:
    applying optical pulses to both ends of an optical fiber cable to be tested so that said applied optical pulses meet at a desired location along the cable,
    measuring a time period $t_1$ and a time period $t_2$, where $t_1$ is the arrival time of the faster pulse of a Stokes pulse which is generated in said cable according to the stimulated Raman effect and a pumping pulse which is applied to said cable and propagates therealong, and $t_1+t_2$ is the arrival time of the other pulse,
    determining distribution of elongation (d $\Delta z/dz$) using the equations $z=k_1t_1-k_2t_2$, and $\Delta z=k_3t_2-k_4t_1$, where $k_1$, $k_2$, $k_3$ and $k_4$ are constants, z is the length of said cable between an end thereof and a location to be tested, and z is the elongation of a small length at location z.

2. An apparatus for measuring distribuion of elongation in an optical fiber cable, comprising:
    a pulse generator for providing an electrical pulse train,
    at least one delay circuit in operable connection with said pulse generator, for selectively delaying said pulse train output from said pulse generator,
    a pair of laser means each converting said electrical pulse train into an optical pulse train, each of said pair of laser means being provided with means for applying said respective optical pulse trains therefrom as a pair of pumping pulses at respective ends of an optical fiber cable to be tested,
    a first beam splitter provided between an output of a first one of the pair of laser means and the optical fiber cable, for separating optical pulses from said first laser means into a first offset optical pulse beam,
    a second beam splitter provided between said first beam splitter and an end of the optical fiber cable to be tested for offsetting optical pulses output from the optical fiber cable into a second offset optical pulse beam,
    conversion means for converting said first and second offset optical pulse beams output respectively from said first and second beam splitters into respective electrical pulses, and
    means in operable connection with said conversion means for measuring the respective arrival times of each of a pumping pulse having the same frequency as that of said laser means and propagated through the whole length of the optical fiber cable to be tested and a Stokes pulse generated by the stimulated Raman effect in the cable to be tested, at the end of the cable to be tested at which said second beam splitter is provided and for determining elongation in the cable in accordance with the time period between said respective arrival times.

3. An apparatus for measuring distribution of elongation in an optical fiber cable according to claim 2, wherein a mirror is provided at one end of the optical fiber to be tested so that an optical beam in the optical fiber cable is reflected and only one laser means is provided.

4. An apparatus for measuring distribution of elongation in an optical fiber cable according to claim 2, wherein each laser means is a YAG laser.

* * * * *